(12) United States Patent
Bacallao (10) Patent No.: US 10,232,759 B2
(45) Date of Patent: Mar. 19, 2019

(54) CASH SECURITY SYSTEM FOR A RETAIL STORE

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/916,322

(22) Filed: Mar. 9, 2018

(65) Prior Publication Data

US 2018/0257538 A1    Sep. 13, 2018

Related U.S. Application Data

(60) Provisional application No. 62/470,743, filed on Mar. 13, 2017.

(51) Int. Cl.
| | |
|---|---|
| *B60P 3/03* | (2006.01) |
| *B62B 5/00* | (2006.01) |
| *B62B 5/04* | (2006.01) |
| *G07D 11/00* | (2006.01) |
| *G08B 13/22* | (2006.01) |

(52) U.S. Cl.
CPC .............. *B60P 3/03* (2013.01); *B62B 5/0096* (2013.01); *B62B 5/0423* (2013.01); *G07D 11/0009* (2013.01); *G07D 11/0012* (2013.01); *G08B 13/22* (2013.01)

(58) Field of Classification Search
CPC ....... B60P 3/03; B62B 5/0096; B62B 5/0423; G07D 11/0009; G07D 11/0012

USPC ...................................................... 340/426.1
See application file for complete search history.

(56) References Cited

U.S. PATENT DOCUMENTS

| | | | |
|---|---|---|---|
| 4,071,740 A | 1/1978 | Gogulski | |
| 5,418,354 A | 5/1995 | Halling et al. | |
| 5,726,430 A | 3/1998 | Ruggirello | |
| 6,041,894 A * | 3/2000 | Otterson | B62B 5/04 |
| | | | 188/19 |
| 6,123,346 A * | 9/2000 | Baldwin | B62B 3/008 |
| | | | 280/47.16 |
| 6,237,725 B1 | 5/2001 | Otterson et al. | |
| 6,845,905 B2 | 1/2005 | Blad et al. | |
| 7,395,965 B2 * | 7/2008 | Franks, Jr. | G07D 11/009 |
| | | | 235/379 |
| 7,965,184 B1 | 6/2011 | Nichols et al. | |

(Continued)

*Primary Examiner* — John A Tweel, Jr.
(74) *Attorney, Agent, or Firm* — Schmeiser, Olsen & Watts LLP (57) ABSTRACT

Disclosed is a cash security system for a retail store that includes a cash cart, a base station, a key, and a cart detector. The cash cart includes a wheeled cart body, a cash box, and a cart security module. The cash cart is used to carry cash within the retail store. The cart security module includes a number of security devices and modules that track where the cash cart is in the retail store, and activates alarms if a problem is detected. The base station includes a base station security module with a number of security devices and modules that concurrently track the movement and location of the cash cart. The cart detector, the cart security module, and the base station security module each activate a security alarm if a security issue with the cash cart is detected.

19 Claims, 3 Drawing Sheets

(56) References Cited

U.S. PATENT DOCUMENTS

| | | | |
|---|---|---|---|
| 8,392,506 B2 * | 3/2013 | Rowe | G07F 17/32 709/205 |
| 2002/0011393 A1 | 1/2002 | Siemens | |
| 2010/0102126 A1 | 4/2010 | Benson | |
| 2012/0212321 A1 * | 8/2012 | Keener | G06Q 10/06 340/5.8 |
| 2015/0194012 A1 * | 7/2015 | Hendrickson | G07F 17/32 463/31 |

* cited by examiner

CASH SECURITY SYSTEM FOR A RETAIL STORE

CROSS REFERENCE TO RELATED APPLICATION

This invention claims priority to U.S. provisional patent application Ser. No. 62/470,743, filed Mar. 13, 2017 to Applicant Wal-Mart Stores Inc., and entitled "Cash Security System for a Retail Store", which is incorporated entirely herein by reference.

BACKGROUND OF THE INVENTION

Technical Field

This invention relates to cash carts that transport cash in a retail store, and specifically to a security system for cash carts in retail stores.

State of the Art

Cash carts for retail stores are carts with cash boxes that are used to pick up or drop off cash at checkout stations or other locations in retail stores. Cash carts are often used to pick up cash at a checkout station, and transport the cash to an office for deposit at a bank. Because cash carts are carrying cash, the security of the cash cart is an issue.

Accordingly, what is needed is a system for keeping a cash cart secure in a retail store.

DETAILED DESCRIPTION OF EMBODIMENTS OF THE INVENTION

As discussed above, embodiments of the present invention relate to cash carts for transporting cash in a retail store, and specifically to a security system for cash carts in the retail store. Cash carts are carts used in retail stores to transport money in a retail store, such as on its way to or from a checkout station. Cash carts often have locked cash boxes, which are more secure than merely putting the cash in an envelope and walking through the store with the envelope. Because cash carts can carry a considerable amount of money, they have serious security risks. Stealing a cash cart will be more profitable for a criminal than holding up a cashier at a single checkout register, for example. Cash carts are escorted on their route through the retail store, but overcoming the escort remains tempting to criminals. What is needed is a way to remotely monitor the movement and location of the cash cart so that an alarm is sounded, and possibly the police are called, if the cash cart is broken into, stolen, or tampered with, or if the cash cart is in a location outside of where it should be.

Disclosed is a cash security system for a retail store that includes a cash cart, a base station, a key, and a cart detector. The cash cart includes a wheeled cart body, a cash box, and a cart security module. The cart security module includes a number of security devices apparatuses and/or programs that track where the cash cart is in the retail store, and activates alarms if a problem is detected. The base station is a location in the retail store that includes a base station security module. The base station security module also includes a number of security programs and/or devices and utilities that concurrently track the movement and location of the cash cart. The base station security module activates an alarm if a problem with the cash cart is detected. The cart detector is placed near the door or other security-sensitive site in the retail store that the cash cart should not be near. The cart detector activates an alarm if the cash cart gets near enough to the cart detector that the cart detector detects the cash cart. The cart security module, and the base station security module use tracking and location devices to determine where the cash cart is and how much money it is carrying. The cart security module and the base station security module perform redundant security checks in case one or the other is incapacitated or nonfunctional. The key provides access to the cash cart, and is carried by an escort of the cash cart. The cart security module and the base security module both track the key and its position relative to the cash cart and sound an alarm if the key gets too far from the cash cart. The cash security system provides hardware and/or software that detects and tracks the cash cart and its contents and redundantly performs constant security analysis. If an issue is found, an alarm is activated and/or the police are called.

Figure 1:
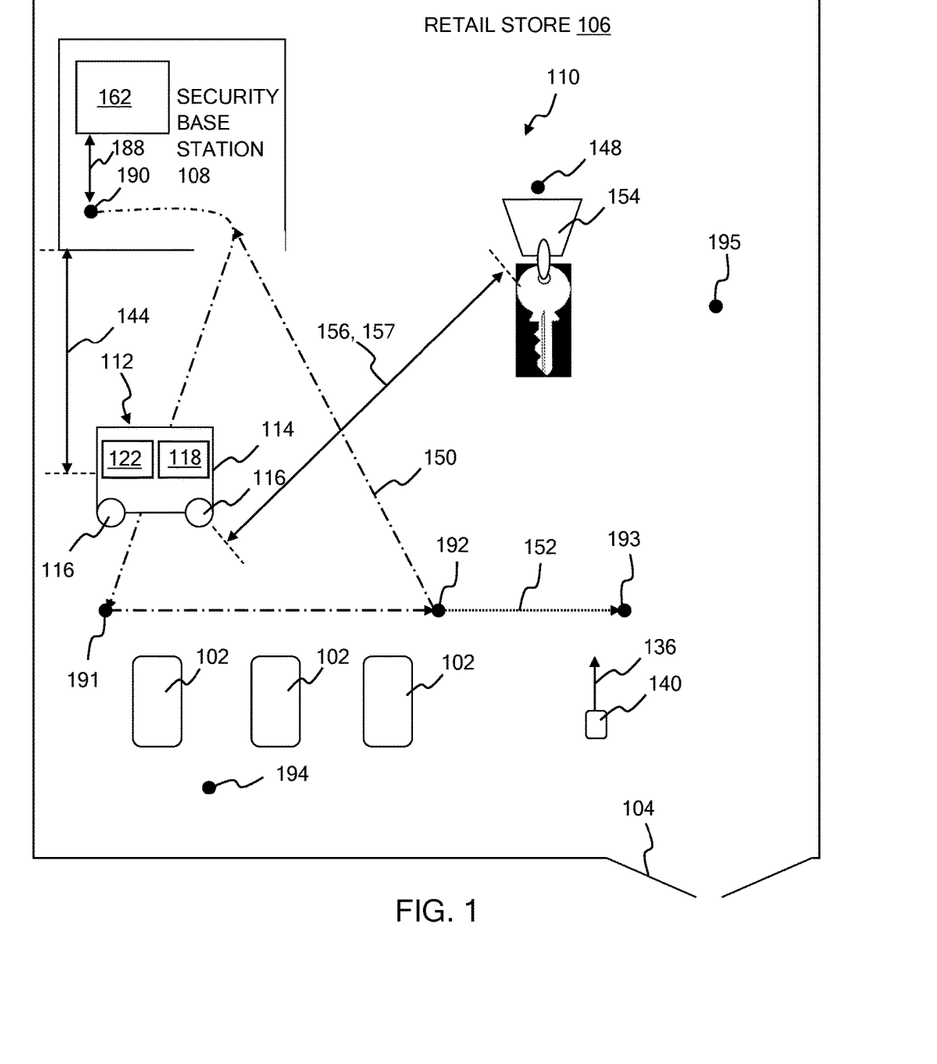
FIG. 1 shows a simplified illustration of a cash security system at a retail store.
Figure 2:
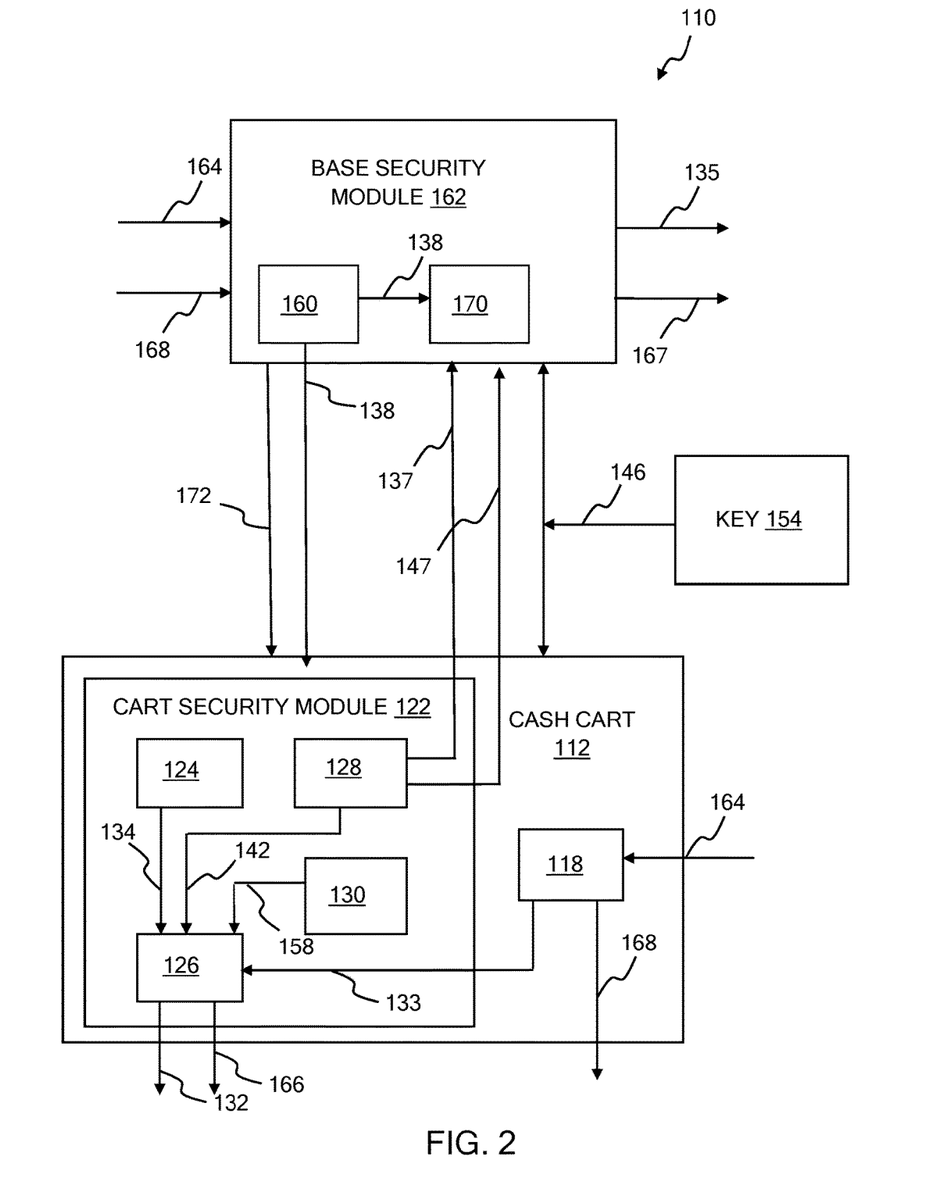
FIG. 2 shows a simplified block diagram of the cash security system at the retail store of FIG. 1.

FIG. 1 shows a simplified diagram of a cash security system 110 in a retail store 106. FIG. 2 shows a block diagram of cash security system 110. Retail store 106 includes cash security system 110, three checkout stations 102 and a door 104, as shown in FIG. 1. Cash security system 110 includes a cash cart 112, a security base station 108 with base security module 162, a key 154, and a cart detector 140.

Retail store 106 uses security system 110 to keep cash cart 112 secure. Cash cart 112 includes a cash box 118 and transports cash in retail store. 106. Cart detector 140 detects when cash cart 112 gets near an unauthorized location such as a door 104 of retail store 106. Key 154 accesses cash box 118 and is carried by an escort to cash cart 112.

Retail store 106 includes security base station 108. Security base station 108 is often an office that includes security personnel and equipment. In this embodiment, security base station 108 is an office that houses base security module 162. Security base station 108 includes a server that includes base security module 162, in this embodiment, but this is not meant to be limiting. Base security module 162 can be a hardware device, a specialized application integrated circuit, an electronic circuit device, a combination of hardware, software, and firmware, or any device that can accept an input and product an output. Base security module 162 can be in any location that is remote from cash cart 112. Base security module 162 being remote from cash cart 112 means, for purposes of this document, that base security module 162 is not contained in cash cart 112, and base security module 162 is located a cart-to-security-module distance 188 from cash cart 112 such that cart-to-security- module distance 188 is larger than a predetermined remote cart to security module distance. Base security module 162 is remote from cash cart 112 because base security module 162 and cash cart 112 perform redundant security operations as explained herein, and if one is incapacitated, the other must work. Base security module 162 can be on a server in retail store 106 or remote from retail store 106. Base security module 162 is software and/or firmware on a server in this embodiment, but this is not meant to be limiting. In some embodiments, base security module 162 is or includes electronic circuits and/or electronic devices.

Cash cart 112 includes a cart body 114 with at least one wheel 116. Cash cart 112 travels on wheels 116 as cash is picked up and delivered to checkout stations 102. Cash cart 112 includes cash box 118 and a cart security module 122, as shown in FIG. 1 and FIG. 2. Cash box 118 holds an amount of cash. Cash cart 112 is wheeled to each of checkout stations 102 to drop off or pick up cash. Cash cart 112 is stored in security base station 108 in this embodiment, in a cash cart location 190, as shown in FIG. 1. Cash cart 112 travels on a route 150, and is escorted by an employee that carries key 154. Key 154 opens cash box 118. Key 154 outputs key location data 146 (see FIG. 2), which is used by both cash cart 112 and base security module 162 to keep track of key 154, as explained herein. Route 150, in this embodiment, begins at location 190, extends from location 190 to location 191, from location 191 to location 192, then back to location 190 in security base station 108. Route 150 is an approved route for cash cart 112.

Cart security module 122 is an electronic device that performs the security calculations for cash cart 112. Cart security module 122, and any of the modules described in this document can include any one or more of electronic devices, electronic circuits, application specific integrated circuits, firmware and software. Cart security module 122 includes a route tracking module 124 and a cash cart alarm module 126. Route tracking module 124 tracks the route of cash cart 112, and outputs a route fault indicator 134 in response to determining that cash cart 112 is taking an unapproved route. For example, route tracking module 124 is programmed to know that route 150 is an approved route, in this embodiment. As long as cash cart 112 stays on route 150, route tracking module 124 does not output route fault indicator 134. However, if cash cart 112 deviates from route 150, such as by moving along a route 152 between location 192 and location 193, as shown in FIG. 1, route tracking module 124 determines that route 152 is not an approved route for cash cart 112, and outputs route fault indicator 134 in response. Route tracking module 124 can use many different types of electronic devices, circuits, and software to track the route of cash cart 112, as is known in the art. Route tracking module 124 can use global positioning system (GPS) devices, accelerometers, cameras, optical or electronic detectors, electronic circuits, firmware, and software to track the route of cash cart 112. Route tracking module 124 is programmed with approved routes such as route 150. When cash cart 112 is using an approved route such as route 150, route tracking module 124 does not output route fault indicator 134. When cash cart 112 deviates from approved routes such as using route 152 instead of route 150, route tracking module 124 outputs route fault indicator 134. Deviating from an approved route means being greater than a predetermined maximum route deviation distance from an approved cart route such as route 150.

Cash security module 122 includes cash cart alarm module 126. Cash cart alarm module 126 outputs a cash cart alarm 132, and/or a police call 166 which calls the police, if trouble is detected with cash cart 112. Cash cart alarm 132 is an audible alarm in this embodiment, but this is not meant to be limiting. Cash cart alarm 132 can be any type of audible, electronic, optical, or other alarm meant to notify others that there is a security issue. Cash cart alarm module 126 can be a software program, firmware, or hardware circuits that activates, or sounds, alarms 132, 166, or other alarms if route fault indicator 134 is received, or if other indications of security issues are received, as explained herein. Cash cart alarm module 126 is programmed to sound (output, activate) cash cart alarm 132 in response to receiving route fault indicator 134 from route tracking module 124. Cash cart alarm module 126 activates a timer once cash cart alarm 132 is activated. If cash cart alarm 132 is not deactivated with a predetermined maximum time since alarm activation, cash cart alarm module 126 outputs police call 166, which summons the police to retail store 106. This gives retail store 106 an amount of time to investigate why cash cart alarm 132 was activated and to de-activate cash cart alarm 132 if desired. If cash cart alarm 132 is not de-activated within the predetermined maximum time since alarm activation, police call 166 is output. In some embodiments, cash cart alarm module 126 can output other types of alarms or notifications. Route tracking module 124 is one way that cash security system 110 monitors the movement of cash cart 112, and sounds an alarm if trouble is suspected.

Cash security system 110 also includes cart detector 140. Cart detector 140 is located near door 104 in this embodiment, but this is not meant to be limiting. Cart detector 140 activates a cart detector alarm 136, which can be audible, electronic, optical, telephonic, etc, in response to detecting cash cart 112. Cart detector 140 is placed in a location that cash cart 112 should not be near. In this embodiment, cart detector 140 is placed near door 104, but cart detector 140 can be placed in any location that cash cart 112 should not be near. If cash cart 112 is moved to a location where cart detector 140 can detect cash cart 112, cart detector 140 will output cart detector alarm 136. If an individual tries to move cash cart 112 near or out door 104, for example, cart detector 140 will detect cash cart 112 and sound cash cart alarm 136. Cart detector 140 can use any number of methods known now or in the future to detect cash cart 112, including electronic sensors, optical sensors, mechanical sensor, etc. Cart detector 140 is another means used by cart security system 110 to detect the location and movement of cash cart 112. Cart detector 140 will activate cart detector alarm 136 even if cash cart 112 has had its security systems disabled. Cart detector 140 detecting cash cart 112 means that a cart detector distance between cash cart 112 and cart detector 140 is less than a minimum predetermined cart detector distance. Cart detector 140 can be designed to compute the cart detector distance between cash cart 112 and cart detector 140, or be designed such that if the cart detector distance between cash cart 112 and cart detector 140 is larger than the minimum predetermined cart detector distance, cart detector 140 will not detect the presence of cash cart 112.

In this embodiment, cart detector 140 sounds cart detector alarm 136 in response to receiving cash cart alarm 132. So if cash cart 112 outputs cash cart alarm 132, cart detector 140 will also output cart detector alarm 136.

Cart security module 122 also includes a cart location tracking module 128, as shown in FIG. 2. Cart location tracking module 128 determines a cash cart location 137 (FIG. 2) of cash cart 112. Cart location tracking module 128 can use any number of means to determine cash cart location 137 of cash cart 112, include GPS sensors, cameras, electronic sensors, or any other means known now or in the future to determine the location of a body. Cart location tracking module 128 determines cash cart location 137 of cash cart 112 and outputs cash cart location 137 in response. Cart location tracking module 128 also outputs cart location data 147 (FIG. 2) that can be used by other devices to determine the location of cart body 112. Cart location data 147 can include GPS raw data, for example, or other data used to compute cash cart location 137.

Cart location tracking module 128 is designed to know which locations in retail store 106 are authorized and unauthorized locations for cash cart 112. Locations 190, 191, and 192 are authorized locations of cash cart 112, in this example embodiment. Locations 193, 194, and 195 are unauthorized locations of cash cart 112. Cart location tracking module 128 determines cash cart location 137. Cart location tracking module 128 then determines whether cash cart location 137 is an authorized or unauthorized location. Cart location tracking module 128 outputs a location fault indicator 142 in response to cash cart location 137 being an unauthorized location. This is another way in which cash security system 110 monitors cash cart 112 and activates an alarm if trouble is indicated. Cash cart alarm module 126 outputs cash cart alarm 132 in response to receiving location fault indicator 142.

Once cart location tracking module 128 computes cash cart location 137, cart location module 128 computes a base station distance 144. Cart location module 128 uses the known location of security base station 108, and cash cart location 137, to compute base station distance 144. Base station distance 144 is the distance between cash cart 112 and security base station 108. If base station distance 144 is greater than a predetermined maximum base station distance, cart location tracking module 128 will output location fault indicator 142. Thus, if cash cart 112 gets too far away from security base station 108, cash cart alarm module 126 will receive location fault indicator 142 and will output cash cart alarm 132.

Cart security module 122 also includes a cart key tracking module 130. Cart key tracking module 130 receives key location data 146 from key 154. Key 154 is an electronic key that continuously outputs key location data 146. Key location data 146 can be GPS coordinates or other electronic data that can be used to compute a key location, which, in the embodiment shown in FIG. 1, is key location 148. Key location 148 can be identified by GPS coordinates or any other data which identifies a specific location in retail store 106. In some embodiments, key location data 146 is key location 148, but this is not meant to be limiting. In some embodiments, key location data 146 is data used to compute key location 148. Cart key tracking module 130 computes a key distance 156 in response to receiving key location data 146. Key distance 156 is the distance between key 154 and cash cart 112, and should be within a predetermined maximum key distance. Cart key tracking module 130 outputs a key fault indicator 158 if it determines there is a problem with key 154. Cart key tracking module 130 outputs key fault indicator 158 when it is unable to receive key location data 146. If cart key tracking module 130 is not receiving key location data 146, then key 154 is too far away, has been incapacitated, or is otherwise unable to transmit key location data 146 to cart key tracking module 130.

Cart key tracking module 130 also outputs key fault indicator 158 if key distance 156 is greater than the predetermined maximum key distance. If key distance 156 is greater than the predetermined maximum key distance, it means that key 154 is too far from cash cart 112. Maybe key 154 has been stolen or lost, maybe cash cart 112 has been separated from its escort with key 154. Whatever the reason, if key distance 156 is greater than the predetermined maximum key distance, cart key tracking module 130 outputs key fault indicator 158.

Cash cart alarm module 126 is programmed to sound (output, activate) cash cart alarm 132 in response to receiving key fault indicator 158 from key tracking module 130. Cash cart alarm module 126 activates a timer once cash cart alarm 132 is activated. If cash cart alarm 132 is not deactivated with a predetermined maximum time since alarm activation, cash cart alarm module 126 outputs police call 166, which calls the police to retail store 106. Cart key tracking module 130 is a way that cash security system 110 monitors the movement of key 154 with respect to cash cart 112, and sounds an alarm if trouble is suspected.

Cash cart 112 includes cash box 118. Cash box 118 receives a deposited cash amount 164. Deposited cash amount 164 is an electronic signal that indicates how much money is being put in cash box 118. Deposited cash amount 164 can come from security base station 108, from base security module 162, from checkout stations 102, or from a mobile device of a cashier or the escort of cash cart 112, for example. Once cash is physically put in cash box 118, cash box 118 counts the cash in cash box 118 and outputs counted cash amount 168. Counted cash amount 168 indicates the amount of cash that cash box has counted. If deposited cash amount 164 does not match counted cash amount 168, a security issue is assumed. Cash box 118 outputs a cash fault indicator 133 in response to counted cash amount 168 being different from deposited cash amount 164. In some embodiments, cash box 118 outputs a cash fault indicator 133 in response to counted cash amount 168 being different from deposited cash amount 164 by an amount greater than a predetermined cash difference.

Cash cart alarm module 126 is programmed to sound (output, activate) cash cart alarm 132 in response to receiving cash fault indicator 133 from cash box 118. Cash alarm module 126 activates a timer once cash cart alarm 132 is activated. If cash cart alarm 132 is not deactivated with a predetermined maximum time since alarm activation, cash cart alarm module 126 outputs police call 166, which calls the police to retail store 106. Cash cart 118, deposited cash amount 164, and counted cash amount 168 is a way that cash security system 110 monitors the amount of cash in cash box 118, and sounds an alarm if trouble is suspected.

Cash security system 110 also includes base security module 162 that is located in security base station 108 in this embodiment. Base security module 162 duplicates some of the security calculations performed by cart security module 122. These duplicate calculations are used to activate alarms in case cash cart 112 and/or cart security module 122 is inoperative due to accident or malicious activity. If cart security module 122 is rendered inoperative through malicious activity, for example, base station security module 162 will monitor the situation and will activate an alarm or call the police if needed, as explained herein. In some situations, cart security module 122 may not be totally inoperative, but may be made to output false data in an attempt to hide the fact that cash cart 112 is not where it should be. Base security module 162 works to detect such anomalies and sound an alarm if needed. Base security module 162 is located remote from cash cart 112, so that base security module 162 is not harmed or rendered inoperative if cash cart 112 is harmed or rendered inoperative.

Base security module 162 receives key location data 146 from key 154, cart location data 147 from cash cart 112, and a first computed cart location 137 from cash cart 112. Base security module 162 also receives deposited cash amount 164 and counted cash amount 168, as shown in FIG. 2.

Base security module 162 outputs (sounds, activates) a base station alarm 135 if a security issue is detected. Similar to cart security module 122, base security module 162 can also output a base police call 167 if needed. Base police call 167 will summon law enforcement to retail store 106. Base security module 162 will keep track of how long either base station alarm 135 or cash cart alarm 132 has been on, and will activate base police call 167 if either alarm has been on too long.

Base security module 162 will activate base station alarm 135 if it is unable to receive any of key location data 146 from key 154, cart location data 147 from cash cart 112, first computed cart location 137 from cash cart 112, deposited cash amount 164 or counted cash amount 168. If base security module 162 does not receive any individual one of these inputs, base security alarm 135 will be activated so that the problem can be addressed.

Base security module 162 includes a base cart location module 160 and a base location compare module 170, as shown in FIG. 2. Base cart location module 160 and base location compare module 170 are software utilities on a server in this embodiment, but this is not meant to be limiting. Base cart location module 160 and base location compare module 170 can be any module that receives inputs and produces outputs, such as a circuit, one or more semiconductor chip, application specific integrated circuit, electronic device, firmware, or software, for example but not by way of limitation.

Base cart location module 160 uses cart location data 147 to compute or determine a second cart location 138. Base security module 162 can then use second cart location 138 to perform security checks on cash cart 112. Base security module 162 outputs second cart location 138.

If base security module 162 determines that second cart location 138 is an unauthorized location, such as location 193, 194, or 195, then base security module 162 will output base station alarm 135.

Cart location comparison module 170 computes a cart location difference 172. Cart location difference 172 is the difference between first cart location 137 from cash cart 112, and second cart location 138 from base cart location module 160. First computed cart location 137 and second computed cart location 138 should indicate the same location for cash cart 112, within a location margin of error. If cart location difference 172 is greater than a predetermined maximum cart location difference, base security module 162 will output base station alarm 135. Cart location difference 172 is outputted to cash cart 112 so that cash security module 122 can use it in security calculations.

Base security module 162 also computes key distance 156 using key location data 146 and cart location data 147. If key distance 156 is larger than a predetermined maximum key distance, base security module 162 outputs base station alarm 135. The calculation of key distance 156 duplicates the same calculation done by cart key tracking module 130, and provides duplicate calculations in case of difficulties with either base security module 162 or cart key tracking module 130.

Base security module 162 also duplicates the calculation of base station distance 144. If base station distance 144 is larger than a predetermined maximum base station difference, base security module 162 outputs base station alarm 135.

In some embodiments, base station security module 162 uses either or both of cart location data 147 or first or second computed cart locations 137 or 138 to calculate a door distance between cash cart 112 and door 104. Base station security module 162 sounds (outputs, activates) base station alarm 135 if the door distance is greater than a predetermined maximum door distance.

Base station security module 162 provides security monitoring and duplicate security calculations to some of the calculations done by cart security module 122. If base station security module 162 receives cash cart alarm 132 from cash cart 112, or cart detector alarm 136 from cart detector 140, base station security module 162 will output base station alarm 135. When base station security module 162 does not receive cash cart location 137 from cash cart 112, base station security module 162 outputs base station alarm 135. If base station security module 162 is unable to receive cart location data 147 from cash cart 112, base station security module 162 outputs base station alarm 135.

Base station security module 162 has the capability to lock doors 104. Base security module 162 will lock door 104 of retail store 106, and in some embodiments output base station alarm 135, in response to receiving cash cart alarm 132, or in response to receiving cart detector alarm 136, or in response to outputting base station alarm 135.

Base station security module 162 can instruct one or more wheels 116 of cash cart body 114 to lock. Base security module 162 will lock one or more wheel 116 of cash cart 112, and in some embodiments output base station alarm 135, in response to receiving cash cart alarm 132, or in response to receiving cart detector alarm 136, or in response to outputting base station alarm 135.

Cash security system 110 includes a number of overlapping and redundant security devices and calculations to keep the cash in cash box 118 of cash cart 112 secure. Cart security module 122 and base security module 162 independently monitor the location and movement of cash cart 112 and key 154, and output an alarm if trouble is detected. The overlapping capabilities provide duplicate security checks in case one or the other of cart security module 122 or base security module 162 are rendered inoperative or are tampered with. Cart security module 122 tracks cash cart 112 with its cash box 118. Base security module 162 also tracks cash cart 112. Both base security module 162 and cart security module 122 track key 154 and its distance from cash cart 112. Both base security module 162 and cart security module 122 output an alarm if deposited cash amount 164 is different from counted cash amount 168. Cart detector 140 outputs cart detector alarm 136 if cart detector 140 detects cash cart 112, which means that cash cart 112 is too close to cart detector 140. Base security module 162, cart detector 140, and cart security module 122 output an alarm if trouble is suspected. If the alarms are not deactivated within a predetermined amount of time, the police are called.

Figure 3:
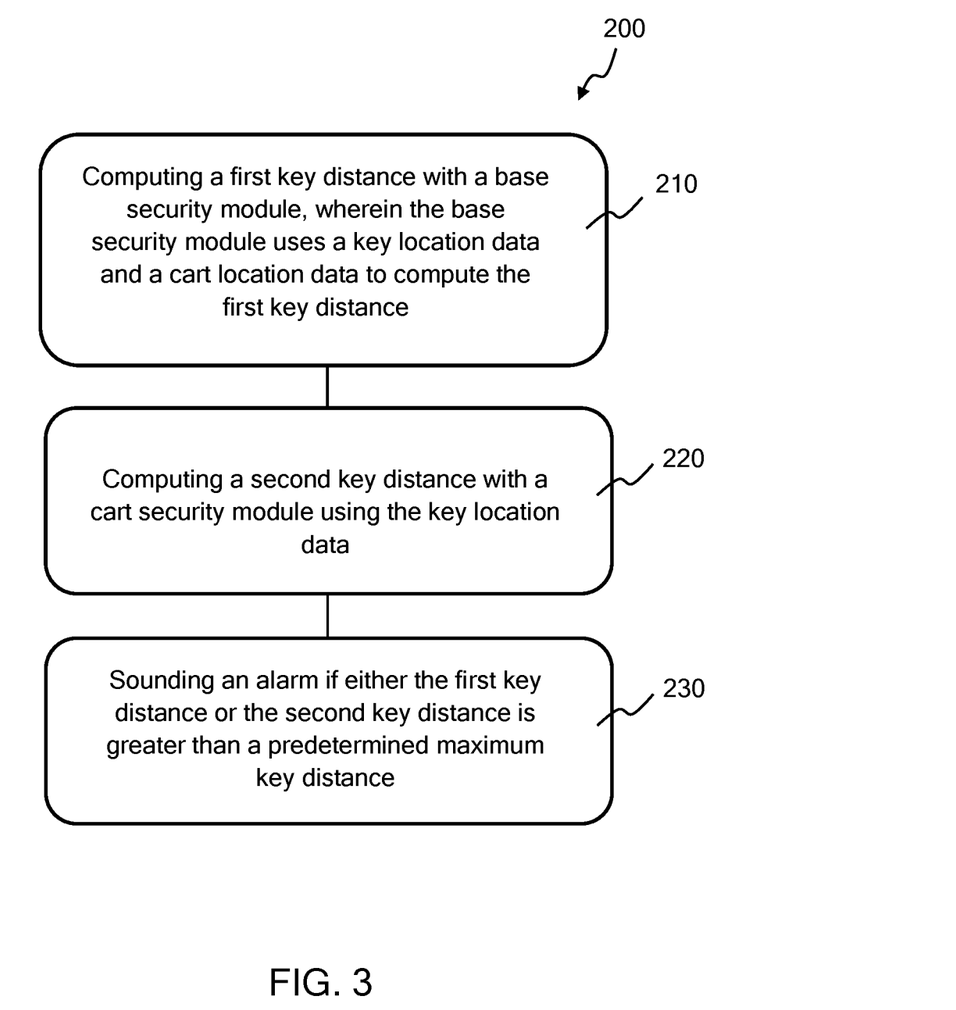
FIG. 3 illustrates a method of securing a cash cart in a retail store.

FIG. 3 illustrates a method 200 of securing a cash cart in a retail store. Method 200 includes an act 210 of computing a first key distance with a base security module. The base security module uses key location data received from a key and cart location data received from the cash cart to compute the first key distance. The key distance is the distance between the cash cart and the key. The base security module is remote from the cash cart, and the cart security module is contained within the cash cart. In some embodiments, method 200 includes sounding the alarm if the base security module is unable to receive the cart location data.

Method 200 also includes an act 220 of computing a second key distance with a cart security module, wherein the cart security module uses the key location data received from the key to compute the second key distance.

The first key distance and the second key distance should both be smaller than a predetermined maximum key distance. The predetermined maximum key distance is the distance that has been determined to be allowable between the key and the cash cart. The key is carried by an escort of the cash cart and should not be too far away from the cash cart. The first key distance and the second key distance should be the same value within some margin of error. If they are not the same value, there may be a security issue.

Method 200 includes an act 230 of sounding an alarm if either the first key distance or the second key distance is greater than a predetermined maximum key distance.

Method 200 can include many other acts. In some embodiments, method 200 includes sounding the alarm if the difference between the first key distance and the second key distance is greater than the predetermined maximum difference.

In some embodiments, method 200 includes using the cart location data to calculate a door distance between the cash cart and a door. In some embodiments, method 200 includes sounding the alarm if the door distance is greater than a predetermined maximum door distance.

In some embodiments, method 200 includes computing a first cash cart location with the cart security module. In some embodiments, method 200 includes transmitting the first cash cart location from the cash security module to the base security module. In some embodiments, method 200 includes computing a second cash cart location with the base security module, where the base security module uses the cart location data received from the cash cart to compute the second cash cart location. In some embodiments, method 200 includes computing a cash cart location difference with the base security module, where the cash cart location difference is a difference between the first cash cart location and the second cash cart location. In some embodiments, method 200 includes sounding the alarm if the cash cart location difference is greater than a predetermined maximum cash cart location difference.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A cash security system for a retail store comprising:
    a cash cart comprising:
        a cart body with at least one wheel;
        a cash box contained in the cart body, wherein the cash box holds an amount of cash; and
        a cart security module contained in the cart body, wherein the cart security module comprises:
            a route tracking module, wherein the route tracking module tracks a route of the cash cart; and
            a cash cart alarm module, wherein the cash cart alarm module outputs a cash cart alarm in response to the cash cart alarm module receiving a route fault indicator from the route tracking module; and
    a cart detector located in the retail store, wherein the cart detector outputs a cart detector alarm in response to the cart detector detecting that a cart detector distance between the cash cart and the cart detector is less than a minimum predetermined cart detector distance.

2. The cash security system of claim 1, wherein the cart detector outputs the cart detector alarm in response to the cart detector receiving the cash cart alarm.

3. The cash security system of claim 1, wherein the route tracking module outputs the route fault indicator in response to the route of the cash cart deviating by more than a maximum route deviation distance from an approved cart route.

4. The cash security system of claim 1, wherein the cart security module further comprises a cart location tracking module, wherein the cart location tracking module computes a first cash cart location, and wherein the cart location tracking module outputs a location fault indicator in response to the first cash cart location being an unauthorized cash cart location.

5. The cash security system of claim 4, wherein the cart location tracking module computes a base station distance, wherein the base station distance is a distance between the cash cart and a base station of the retail store, and wherein the cart location tracking module outputs the location fault indicator in response to the base station distance being larger than a predetermined maximum base station distance.

6. The cash security system of claim 5, wherein the cash cart alarm module outputs the cash cart alarm in response to the cash cart alarm module receiving the location fault indicator from the cart location tracking module.

7. The cash security system of claim 1, wherein the cart security module further comprises a cart key tracking module, wherein the cart key tracking module computes a key distance in response to receiving a key location data from a key, and wherein the cart key tracking module outputs a key fault indicator in response to the key distance being greater than a predetermined maximum key distance.

8. The cash security system of claim 7, wherein the cash cart alarm module outputs the cash cart alarm in response to receiving the key fault indicator from the cart key tracking module.

9. The cash security system of claim 1, wherein the cash box outputs a cash fault indicator in response to a counted cash amount being different from a deposited cash amount, and wherein the cash cart alarm module outputs the cash cart alarm in response to receiving the cash fault indicator from the cash box.

10. The cash security system of claim 1, wherein the cash cart alarm module outputs a police call in response to a time since alarm activation being greater than a predetermined maximum time since alarm activation.

11. The cash security system of claim 1, further comprising a base security module located remote from the cash cart, wherein the base security module receives the first cash cart location from the cash cart, and wherein the base security module comprises:
    a base cart location module, wherein the base cart location module computes a second cash cart location; and
    a cart location comparison module, wherein the cart location comparison module computes a cart location difference, wherein the cart location difference is a difference between the first cash cart location and the second cash cart location;
    wherein the base security module outputs a base station alarm in response to the cart location difference being greater than a predetermined maximum cart location difference.

12. A cash security system in a retail store comprising:
    a cash cart, wherein the cash cart receives a deposited amount of cash from at least one checkout station in the retail store, and wherein the cash cart comprises:
        a cart body with at least one wheel;
        a cash box contained in the cart body, wherein the cash box holds the deposited amount of cash; and
        a cart security module contained in the cart body, wherein the cart security module comprises:
            a route tracking module, wherein the route tracking module tracks a route of the cash cart;
            a cash cart alarm module, wherein the cash cart alarm module outputs a cash cart alarm in response to the cash cart alarm module receiving a route fault indicator from the route tracking module; and a cart location tracking module, wherein the cart location tracking module outputs a first cash cart location; and a base security module located remote from the cash cart, wherein the base security module receives the first cash cart location from the cash cart, and wherein the base security module comprises:

a base cart location module, wherein the base cart location module outputs a second cash cart location; and a cart location comparison module, wherein the cart location comparison module computes a cart location difference, wherein the cart location difference is a difference between the first cash cart location and the second cash cart location;

wherein the base security module outputs a base station alarm in response to the cart location difference being greater than a predetermined maximum cart location difference.

13. The cash security system of claim 12, wherein the base security module computes a key distance in response to receiving key location data from a key and cart location data from the cash cart, and wherein the key distance is a distance between the cash cart and the key, and wherein the base security module outputs the base station alarm in response to the key distance being larger than a predetermined maximum key distance.

14. The cash security system of claim 12, wherein the base station security module computes a base station distance, wherein the base station distance is a distance between the cash cart and a base station, and wherein the base station security module outputs the base station alarm in response to the base station distance being larger than a predetermined maximum base station distance.

15. The cash security system of claim 12, wherein the base station security module outputs the base station alarm in response to not receiving the first cash cart location from the cash cart.

16. The cash security system of claim 13, wherein the base station security module outputs the base station alarm in response to the base station security module being unable to receive the cart location data from the cash cart.

17. The cash security system of claim 12, wherein the base station security module locks a door of the retail store and outputs a base station police call in response to receiving the cash cart alarm from the cash cart.

18. The cash security system of claim 17, wherein the base station security module instructs a wheel of the cash cart to lock in response to receiving the cash cart alarm from the cash cart.

19. The cash security system of claim 12, further comprising a cart detector located in the retail store, wherein the cart detector outputs a cart detector alarm in response to the cart detector detecting that a cart detector distance between the cash cart and the cart detector is less than a minimum predetermined cart detector distance.

* * * * *